United States Patent
Chen

(10) Patent No.: US 9,141,575 B2
(45) Date of Patent: Sep. 22, 2015

(54) POWER SUPPLY CIRCUIT FOR UNIVERSAL SERIAL BUS INTERFACE

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 355 days.

(21) Appl. No.: 13/684,628

(22) Filed: Nov. 26, 2012

(65) Prior Publication Data
US 2014/0122770 A1    May 1, 2014

(30) Foreign Application Priority Data
Oct. 29, 2012 (CN) .......................... 2012 1 04202662

(51) Int. Cl.
*G06F 13/40* (2006.01)

(52) U.S. Cl.
CPC ................................ *G06F 13/4022* (2013.01)

(58) Field of Classification Search
CPC ..................................................... G06F 13/4022
See application file for complete search history.

(56) References Cited

U.S. PATENT DOCUMENTS

| | | | |
|---|---|---|---|
| 2002/0194514 A1* | 12/2002 | Sanchez | 713/300 |
| 2007/0088964 A1* | 4/2007 | Lee | 713/300 |
| 2009/0248956 A1* | 10/2009 | Parker et al. | 711/103 |
| 2010/0115150 A1* | 5/2010 | Hachiya | 710/19 |
| 2011/0161694 A1* | 6/2011 | Fujiwara | 713/310 |
| 2012/0023341 A1* | 1/2012 | Lin et al. | 713/300 |
| 2013/0313914 A1* | 11/2013 | Hou | 307/115 |

* cited by examiner

*Primary Examiner* — Nimesh G Patel
(74) *Attorney, Agent, or Firm* — Novak Druce Connolly Bove + Quigg LLP

(57) ABSTRACT

A power supply circuit includes a first electronic switch mounted near a front universal serial bus (USB) interface, a second electronic switch mounted near a rear USB interface, and a third electronic switch. The first electronic switch supplies power for the front USB interface. The second electronic switch supplies power for the rear USB interface. The third electronic switch supplies power for the front USB interface and the rear USB interface when the first and second electronic switches are off.

5 Claims, 1 Drawing Sheet

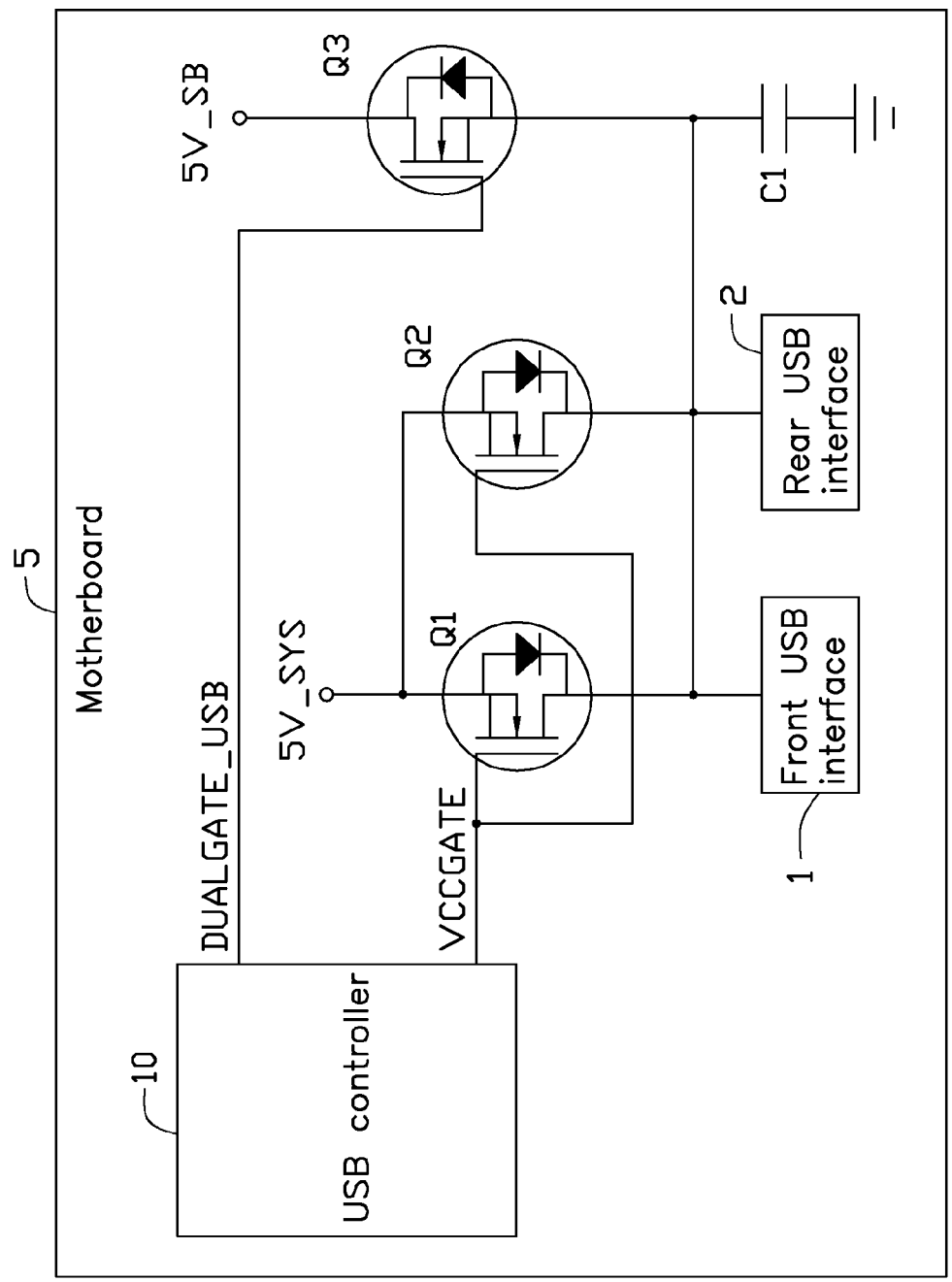

POWER SUPPLY CIRCUIT FOR UNIVERSAL SERIAL BUS INTERFACE

BACKGROUND

1. Technical Field

The present disclosure relates to a power supply circuit for supplying power to universal serial bus (USB) interfaces.

2. Description of Related Art

Generally, a front USB interface and a rear USB interface are respectively mounted on front and rear sides of a motherboard. Because the front USB interface is further away from the motherboard power connector than the rear USB interface, the transmission lines from the connector to the front USB interface is longer and hence must be more robust and larger. This is an inconvenience to designers and manufacturers because of the trend towards miniaturization.

BRIEF DESCRIPTION OF THE DRAWING

Many aspects of the embodiments can be better understood with reference to the following drawing. The components in the drawing are not necessarily drawn to scale, the emphasis instead being placed upon clearly illustrating the principles of the present embodiments.

The FIGURE is a circuit diagram of an exemplary embodiment of a power supply circuit for universal serial bus (USB) interfaces.

DETAILED DESCRIPTION

The disclosure, including the accompanying drawing, is illustrated by way of examples and not by way of limitation. It should be noted that references to "an" or "one" embodiment in this disclosure are not necessarily to the same embodiment, and such references mean "at least one."

The FIGURE shows an embodiment of a power supply circuit for universal serial bus (USB) interfaces. In the embodiment, the USB interfaces include a front USB interface 1 and a rear USB interface 2. The power supply circuit includes three metal oxide semiconductor field effect transistors (MOSFETs) Q1, Q2, and Q3. In the embodiment, the MOSFETs Q1-Q3 are n-channel MOSFETs.

A gate of the MOSFET Q1 is connected to a USB controller 10 on a motherboard 5 to receive a control signal VCCGATE from the USB controller 10. A source of the MOSFET Q1 is connected to a system power supply 5V_SYS. A gate of the MOSFET Q2 is connected to the gate of the MOSFET Q1. A source of the MOSFET Q2 is connected to the source of the MOSFET Q1. A drain of the MOSFET Q1 outputs a 5V_USB power supply for the front USB interface 1. A drain of the MOSFET Q2 outputs a 5V_USB power supply for the rear USB interface 2.

A gate of the MOSFET Q3 is connected to the USB controller 10 to receive a control signal DUALGATE_USB. A drain of the MOSFET Q3 is connected to a standby power supply 5V_SB. A source of the MOSFET Q3 outputs the USB power 5V_USB for the front USB interface 1 and the rear USB interface 2. The source of the MOSFET Q3 is further grounded through a capacitor C1.

According to specification of the USB controller 10, when the motherboard 5 is in the work mode, the control signal VCCGATE from the USB controller 10 is at a high level, and the control signal DUALGATE_USB from the USB controller 10 is at a low level. When the motherboard 5 is in the sleep mode, or when the motherboard 5 is powered off, the control signal VCCGATE from the USB controller 10 is at a low level, and the control signal DUALGATE_USB is at a high level.

Accordingly, when the motherboard 5 is in the work mode, the MOSFETs Q1 and Q2 are turned on, and the MOSFET Q3 is turned off. In this state, the system power supply 5V_SYS supplies the 5V_USB power supply for the front USB interface 1 and for the rear USB interface 2 through the MOSFETs Q1 and Q2.

When the motherboard 5 is in the sleep mode or when the motherboard 5 is powered off, the MOSFETs Q1 and Q2 are turned off, and the MOSFETs Q3 is turned on. In this state, the 5V_SB standby power supply supplies the 5V_USB power supply for the front USB interface 1 and for the rear USB interface 2.

According to wiring rules of the motherboard, there are to be power layers near the front USB interface 1 and near the rear USB interface 2. The MOSFET Q1 is thus mounted near the front USB interface 1, and the MOSFET Q2 is mounted near the rear USB interface 2, to provide the shortest power lines between the system power supply 5V_SYS, the MOSFET Q1, and the front USB interface 1, and also the shortest power lines between the system power supply 5V_SYS, the MOSFET Q2, and the rear USB interface 2. In other words, the lines which carry electrical power can be shorter. With regard to the lines for data transmission between the USB controller 10 and the MOSFETs Q1-Q3, a width of these transmission lines can be 20 millimeters because these transmission lines just transmit the control signals.

With regard to the standby power supply of 5V_SB, according to the specification of the USB, the front USB interface 1 and the rear USB interface 2 may only consume large quantities of current when the motherboard 5 is in the work mode. When the motherboard 5 is in the sleep mode, or when the motherboard 5 is powered off, the front USB interface 1 and the rear USB interface 2 consume insignificant, or very little, current. As a result, a width of the transmission lines between the MOSFET Q3, the front USB interface 1, and the rear USB interface 2, need only be 20 millimeters.

In the embodiment, the MOSFETs Q1-Q3 function as electronic switches.

The foregoing description of the exemplary embodiments of the disclosure has been presented only for the purposes of illustration and description and is not intended to be exhaustive or to limit the disclosure to the precise forms disclosed. Many modifications and variations are possible in light of disclosure above. The embodiments were chosen and described in order to explain the principles of the disclosure and their practical application so as to enable others of ordinary skill in the art to utilize the disclosure and various embodiments, and with such various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than by the foregoing description and the exemplary embodiments described therein.

What is claimed is:

1. A power supply circuit, comprising:
   a first electronic switch mounted near a front universal serial bus (USB) interface on a motherboard, wherein a control terminal of the first electronic switch is connected to a USB controller on the motherboard for receiving a first control signal, a first terminal of the first electronic switch is connected to the front USB interface, a second terminal of the first electronic switch is connected to a system power supply on the motherboard;

a second electronic switch mounted near a rear USB interface on the motherboard, wherein a control terminal of the second electronic switch is connected to the control terminal of the first electronic switch, a first terminal of the second electronic switch is connected to the rear USB interface, a second terminal of the second electronic switch is connected to the second terminal of the first electronic switch; and a third electronic switch, wherein a control terminal of the third electronic switch is connected to the USB controller to receive a second control signal, a first terminal of the third electronic switch is connected to the front USB interface and the rear USB interface, a second terminal of the third electronic switch is connected to a standby power supply;

wherein when the motherboard is in a work mode, the first control signal is at high level and the second control signal is at low level, the first terminal of the first electronic switch is connected to the second terminal of the first electronic switch, the first terminal of the second electronic switch is connected to the second terminal of the second electronic switch, the first terminal of the third electronic switch is disconnected from the second terminal of the third electronic switch, the system power supply supplies system power to the front USB interface and the rear USB interface through the first and second electronic switches respectively; and wherein when the motherboard is in a sleep mode or when the motherboard is powered off, the first control signal is at a low level, and the second control signal is at a high level, the first terminal of the first electronic switch is disconnected from the second terminal of the first electronic switch, the first terminal of the second electronic switch is disconnected from the second terminal of the second electronic switch, the first terminal of the third electronic switch is connected to the second terminal of the third electronic switch, the standby power supply supplies standby power to the front USB interface and the rear USB interface through the third electronic switch.

2. The power supply circuit of claim 1, wherein the first terminal of the third electronic switch is further grounded through a capacitor.

3. The power supply circuit of claim 1, wherein the first electronic switch is an n-channel metallic oxide semiconductor field effect transistor (MOSFET), a gate of the MOSFET is the control terminal of the first electronic switch, a drain of the MOSFET is the first terminal of the first electronic switch, and a source of the MOSFET is the second terminal of the first electronic switch.

4. The power supply circuit of claim 1, wherein the second electronic switch is an n-channel metallic oxide semiconductor field effect transistor (MOSFET), a gate of the MOSFET is the control terminal of the second electronic switch, a drain of the MOSFET is the first terminal of the second electronic switch, and a source of the MOSFET is the second terminal of the second electronic switch.

5. The power supply circuit of claim 1, wherein the third electronic switch is an n-channel metallic oxide semiconductor field effect transistor (MOSFET), a gate of the MOSFET is the control terminal of the third electronic switch, a drain of the MOSFET is the second terminal of the third electronic switch, and a source of the MOSFET is the first terminal of the third electronic switch.

* * * * *